(12) United States Patent
Devey

(10) Patent No.: US 7,430,130 B2
(45) Date of Patent: Sep. 30, 2008

(54) D-OPTIMIZED SWITCHING CONVERTER

(75) Inventor: William Devey, Beaverton, OR (US)

(73) Assignee: Credence Systems Corporation, Milpitas, CA (US)

( * ) Notice: Subject to any disclaimer, the term of this patent is extended or adjusted under 35 U.S.C. 154(b) by 194 days.

(21) Appl. No.: 11/437,777

(22) Filed: May 18, 2006

(65) Prior Publication Data

US 2007/0268006 A1    Nov. 22, 2007

(51) Int. Cl.
H02M 3/335   (2006.01)

(52) U.S. Cl. .................................. 363/16; 363/21.01

(58) Field of Classification Search .............. 363/21.01, 363/34, 16, 17, 20, 21.02; 323/205, 207; 322/22, 24, 28, 29, 46, 15
See application file for complete search history.

(56) References Cited

U.S. PATENT DOCUMENTS

| | | | |
|---|---|---|---|
| 3,900,823 A * | 8/1975 | Sokal et al. | 330/149 |
| 6,300,826 B1 * | 10/2001 | Mathe et al. | 330/10 |
| 6,792,252 B2 * | 9/2004 | Kimball et al. | 455/127.3 |

* cited by examiner

*Primary Examiner*—Rajnikant B Patel
(74) *Attorney, Agent, or Firm*—Daniel J. Bedell; Smith-Hill and Bedell

(57) ABSTRACT

A switching converter produces an output signal transmitted to a variable load impedance to produce a load voltage $V_{DD}$ across the load impedance and holds $V_{DD}$ close to a set point voltage $V_{SP}$ selected by control data $D_{REF1}$ to compensate for variations in the load impedance which tend to drive $V_{DD}$ away from $V_{SP}$. The switching converter includes a pulse-width modulated power converter for producing the output signal of voltage $V_{OUT}$ in response to an input signal of voltage $V_{IN}$, wherein a ratio $V_{OUT}/V_{IN}$ is a function of a duty cycle $D_1$ of a pulse-width modulated signal $V_{PWM1}$. A pulse-width modulation circuit generates the $V_{PWM}$ signal of duty cycle $D_1$ controlled by a control signal, and a feedback control circuit monitoring the load voltage $V_{DD}$ adjusts $D_1$ to keep the load voltage as close as possible to $V_{SP}$. A power source supplies the input signal of voltage $V_{IN}$ to the power converter. Second control data supplied to the power source separately selects the value of $V_{IN}$ for each possible set point voltage $V_{SP}$ such that that the pulse-width modulate signal's duty cycle $D_1$ remains as close a possible to a value for which circuit performance is substantially optimal with respect to a selected combination of performance criteria.

10 Claims, 4 Drawing Sheets

D-OPTIMIZED SWITCHING CONVERTER

BACKGROUND OF THE INVENTION

1. Field of the Invention

The invention relates in general to switching converters used by integrated circuit (IC) testers for supplying power to IC devices under test, and in particular to a feedback compensated switching converter that minimizes variation in its output voltage under varying load conditions.

2. Description of Related Art

An IC tester supplies test signals to input terminals of an IC device under test (DUT) and monitors the DUT's output signals to determine whether they behave as expected. FIG. 1 depicts a typical prior art IC tester 10 including a host computer 12 communicating with a test head 14 via a computer bus 16. Before starting a test, host computer 12 sends program instructions to test head 14 via bus 16 defining the test signal patterns to be applied to DUT 18 during the test and indicating how the DUT output signals are expected to behave. During the test, test head 14 transmits test signals to input terminals of DUT 18, monitors DUT output signals and stores test data indicating whether the DUT output signals behave as expected. After the test, test head 14 forwards the test data to host computer 12 via bus 16.

A typical test head 14 includes a number (N>1) of printed circuit channel cards CH1 through CHN, each implementing one or more tester channels 20. Each tester channel 20 is connected to a separate pin of DUT for supplying a test signal input to the pin or for monitoring a DUT output signal appearing at the pin. A bus interface circuit 22 forwards instructions arriving from host computer 12 via bus 16 to channels 20 and forwards test results data from channels 20 to host computer 12 via bus 16.

A power bus 24 distributes a DC power supply signal $V_{BUS}$ produced by an off-line, AC-to-DC converter 26 to each channel card $CH_1$ through $CH_N$ for powering components on the channel cards. The DC supply voltage $V_{BUS}$ will be relatively high, for example 48 volts DC, to limit the amount of current power bus 24 conveys, but each channel card $CH_1$ through $CH_N$ includes an "intermediate bus converter" 28 for converting the 48VDC $V_{BUS}$ signal to a lower intermediate bus voltage $V_{IB}$, such as for example 12 VDC. Since tester channels 20 require several (M>1) different supply voltages $V_1$-$V_M$ for use as reference voltages and for powering the channels, a set of "point-of-use" converters $30_1$ through $30_M$ are provided on each channel card for converting the intermediate bus voltage $V_{IB}$ into the required supply voltages $V_1$ through $V_M$. Before the test, host computer 12 sends instructions via bus 16 and bus interface circuit 22 to each point-of-use converter 30 for setting each converter's output voltage.

Test head 14 also includes a power supply card 32 for converting the 48VDC $V_{BUS}$ signal into an output signal $V_{OUT}$ connected via signal path to the DUT's power input terminal, thereby producing a load voltage $V_{DD}$ between the DUT's power input terminal and ground. Power supply card 32 includes an intermediate bus converter 34 for converting the fixed bus voltage $V_{BUS}$ into a lower fixed intermediate bus voltage $V_{IN}$, such as 12 VDC, and a compensated point-of-use switching converter 36 for converting the 12VDC $V_{IN}$ voltage into the output signal $V_{OUT}$. A bus interface circuit 38 responds to an instruction from host computer 12 via bus 24 by supplying control data $D_{REF}$ to converter 36 indicating a desired set point voltage level $V_{SP}$ for the DUT load voltage $V_{DD}$.

FIG. 2 models the load and feedback impedance of point-of-use converter 36 of FIG. 1 and shows that a signal path 44 having impedance 40 couples the output signal $V_{OUT}$ of converter 36 to DUT 18 to produce a load voltage $V_{DD}$ across load 41 of the DUT. Path impedance 40, which includes inductance, capacitance and resistance, filters $V_{OUT}$ so that the load voltage $V_{DD}$ appearing across DUT load 41 differs from $V_{OUT}$, particularly when DUT load 41 draws a large current. The load voltage $V_{DD}$ can vary during a test because the amount of current DUT load 41 varies. Since test specifications typically require variations of the load voltage $V_{DD}$ from some specified set-point value $V_{SP}$ to be held within a specified range, converter 36 must compensate for variations in $V_{DD}$. The load voltage $V_{DD}$ is therefore fed back to converter 36 via a separate feedback path 44 (FIG. 1) to enable converter 36 to monitor the load voltage and appropriately adjust its output voltage $V_{DD}$ to keep $V_{DD}$ as near as possible to $V_{SP}$. Although the impedance 42 of feedback path 44 (FIG. 1) filters $V_{DD}$ so that the voltage of the feedback signal $V_{FB}$ converter 36 receives varies somewhat from $V_{DD}$, the current of the feedback signal $V_{FB}$ is relatively small compared to the current of the $V_{OUT}$ signal so that the voltage of feedback signal $V_{FB}$ tracks the voltage of $V_{DD}$ much more closely than the voltage of $V_{DD}$ tracks that of $V_{OUT}$. Thus converter 36 can monitor the DUT input signal voltage $V_{DD}$ by monitoring feedback signal $V_{FB}$ and can adjust $V_{OUT}$ as necessary to keep the voltage of $V_{FB}$, and therefore the voltage of $V_{DD}$, near its desired set point voltage $V_{SP}$.

FIG. 3 depicts a typical prior art architecture for the compensating point-of-use converter 36 of FIGS. 1 and 2, including a digital-to-analog converter (DAC) 50, a feedback control circuit 52, a pulse-width modulator (PWM) 54, and a power converter 56 for converting the input signal $V_{IN}$ from intermediate bus converter 34 (FIG. 1) to the $V_{OUT}$ signal supplied to DUT 16. DAC 50 converts the $D_{REF}$ data from host computer 12 (FIG. 1) into a reference signal $V_{REF}$ of voltage matching the desired set point voltage $V_{SP}$ of $V_{DD}$. Feedback control circuit 52 compares a filtered version of feedback signal $V_{FB}$ to $V_{REF}$ and produces a control signal $V_C$ for controlling PWM circuit 54 which produces a pulse-width-modulated output signal $V_{PWM}$ having a duty cycle D controlled by control signal $V_C$. Power converter 56 responds to $V_{PWM}$ by producing the $V_{OUT}$ signal in response to the $V_{IN}$ signal from intermediate bus converter 34 of FIG. 1. The duty cycle D of $V_{PWM}$ controls the ratio $V_{OUT}/V_{IN}$.

FIG. 4 depicts an example implementation of power converter 56 of FIG. 3. When $V_{PWM}$ is high, transistor Q1 turns on to connect the $V_{IN}$ signal across a diode D1 and across a capacitor C1 via an inductor L1. Capacitor C1 charges, driving UP $V_{OUT}$, which appears across capacitor C1. D1 is typically a FET biased ON, commonly referred to as a synchronous rectifier. When $V_{PWM}$ is low, $V_{IN}$ no longer charges C1 and $V_{OUT}$ falls. The average magnitude of $V_{OUT}$ is therefore a function of the duty cycle D of $V_{PWM}$. This particular power converter, which produces an output voltage $V_{OUT}$ that is less than its input voltage, is called a "buck converter".

FIG. 5 is a timing diagram depicting $V_{PWM}$ as a function of time. The $V_{PWM}$ signal is a square wave of period $T_P$ that is on for a time $T_{ON}$ during each cycle. The ratio $V_{OUT}/V_{IN}$ is equal to the duty cycle $D=T_{ON}/T_P$ of the $V_{PWM}$ signal, set by the voltage of control signal $V_C$ of FIG. 3. In the example buck converter circuit of FIG. 4

$$V_{OUT}/V_{IN}=D.$$

For other types of converter circuits known to those of skill in the art, the ratio $V_{OUT}/V_{IN}$ can be a more complex function of D. For all power converters relying on pulse-width modulation, we can generally express $V_{OUT}/V_{IN}$ as some function of duty cycle D:

$$V_{OUT}/V_{IN}=f(D)$$

For the buck converter of FIG. 4, $$f(D)=D$$

For a typical "boost" converter producing an output voltage $V_{OUT}$ that is higher than its input voltage $V_{IN}$, $$f(D)=1(1-D)$$

For a typical "buck boost" converter producing an output voltage that can be either higher or lower than $V_{IN}$ $$f(D)=-D/(1-D)$$

Other converters known to those of skill in the art, including for example sepic, flyback, forward, two-switch forward, active clamp forward, half bridge, push pull, full bridge, and phase shift converters, have output-to-input voltage ratios characterized by other functions of the duty cycle D of $V_{PWM}$.

Referring again to FIG. 3, a typical feedback control circuit 52 will include an amplifier 36 and a pair of filters 38 and 40. The $V_{REF}$ signal output of DAC 50 drives a non-inverting input of amplifier 36. Filter 38 couples the $V_C$ signal to an inverting input of amplifier 32 while filter 40 couples $V_{FB}$ to the inverting input to amplifier 36. When designing feedback control circuit 52, those of skill in the art design filters 38 and 40 to optimize a selected combination of one or more converter performance criteria such as for example, audiosusceptibility, transient response, closed loop frequency response, noise immunity, and power dissipation. Such performance criteria depend to some extent on the duty cycle D of $V_{PWM}$. A circuit designer will typically choose some nominal value of D, such as for example 0.5, and then design filters 38 and 40 to optimize a desired combination of performance criteria under the assumption that converter circuit 36 will operate at that particular duty cycle. During system operation the value of D will vary when the DUT load varies in order to keep $V_{DD}$ near the selected set point voltage $V_{SP}$, but D will normally not vary over a wide range unless the load varies wildly. If the system is optimized for a value of D of 0.5, and the selected set point voltage $V_{SP}$ causes the value of D to remain close to 0.5, then the converter will exhibit close to optimum performance. However when the selected set point voltage $V_{SP}$ caused the value of D to reside in a range remote from 0.5, the converter will exhibit suboptimal performance. Generally the desired combination of performance criteria will be substantially optimal only for a narrow range of set point voltages and will be substantially less than optimal when the converter is set for any set point voltage outside that narrow range.

One way to resolve this problem is to provide filters 38 and 40 with adjustable transfer functions, and to appropriately adjust their transfer functions to optimize performance criteria for each selected value of VSP. However this approach increases the complexity of the filter design task, increases the cost and complexity of filters 38 and 40, and requires additional circuits for selecting and controlling the filter transfer functions.

What is needed is a converter for which a desired combination of performance criteria is optimized over its entire range of set point voltages without requiring filters having adjustable transfer functions.

SUMMARY OF THE INVENTION

A switching converter in accordance with the invention produces an output signal of voltage $V_{OUT}$ supplied through a signal path to a variable load impedance to produce a load voltage $V_{DD}$ across the load impedance. The switching converter adjusts output signal voltage $V_{OUT}$ to keep load voltage $V_{DD}$ as near as possible to a desired set point voltage $V_{SP}$ selected by input first control data $D_{REF1}$.

The switching converter includes a first power converter powered by an input signal of voltage $V_{IN}$ for producing the output signal $V_{OUT}$. The ratio $V_{OUT}/V_{IN}$ is a function of a duty cycle $D_1$ of a pulse-width modulated signal supplied as input to the first power converter. A pulse-width modulation circuit generates the pulse-width modulated signal with its duty cycle $D_1$. A feedback control circuit monitors the load voltage and adjusts the duty cycle of the pulse-width modulated signal to keep the load voltage near the set point voltage $V_{SP}$ selected by the first control data. A power source supplies the input signal of voltage $V_{IN}$ to the first power converter, with $V_{IN}$ selected by second control data ($D_{REF2}$) supplied as input to the power source.

A transfer function of the feedback circuit is designed to optimize a selected combination of converter performance criteria when the duty cycle $D_1$ of the pulse-width modulated circuit is a particular value $D_x$. Thus in order to produce a load voltage $V_{DD}=V_{SP}$, the first control data is set to select $V_{SP}$ as the set point voltage and the second control data is set to select an appropriate value of $V_{IN}$ so that pulse-width modulated signal's duty cycle $D_1$ remains as close as possible to the value $D_x$ for which circuit performance is substantially optimal with respect to the selected combination of performance criteria.

The claims appended to this specification particularly point out and distinctly claim the subject matter of the invention. However those skilled in the art will best understand both the organization and method of operation of what the applicant(s) consider to be the best mode(s) of practicing the invention by reading the remaining portions of the specification in view of the accompanying drawing(s) wherein like reference characters refer to like elements.

DETAILED DESCRIPTION OF THE INVENTION

The invention is defined by the claims appended to this specification, and the following describes one or more particular modes of practicing the invention recited in the claims. Although the following description includes numerous details in order to provide a thorough understanding of the described mode(s) of practicing the invention, it will be apparent to those of skill in the art that other modes of practicing the invention recited in the claims need not incorporate all such detail except to the extent claimed.

Figure 6:
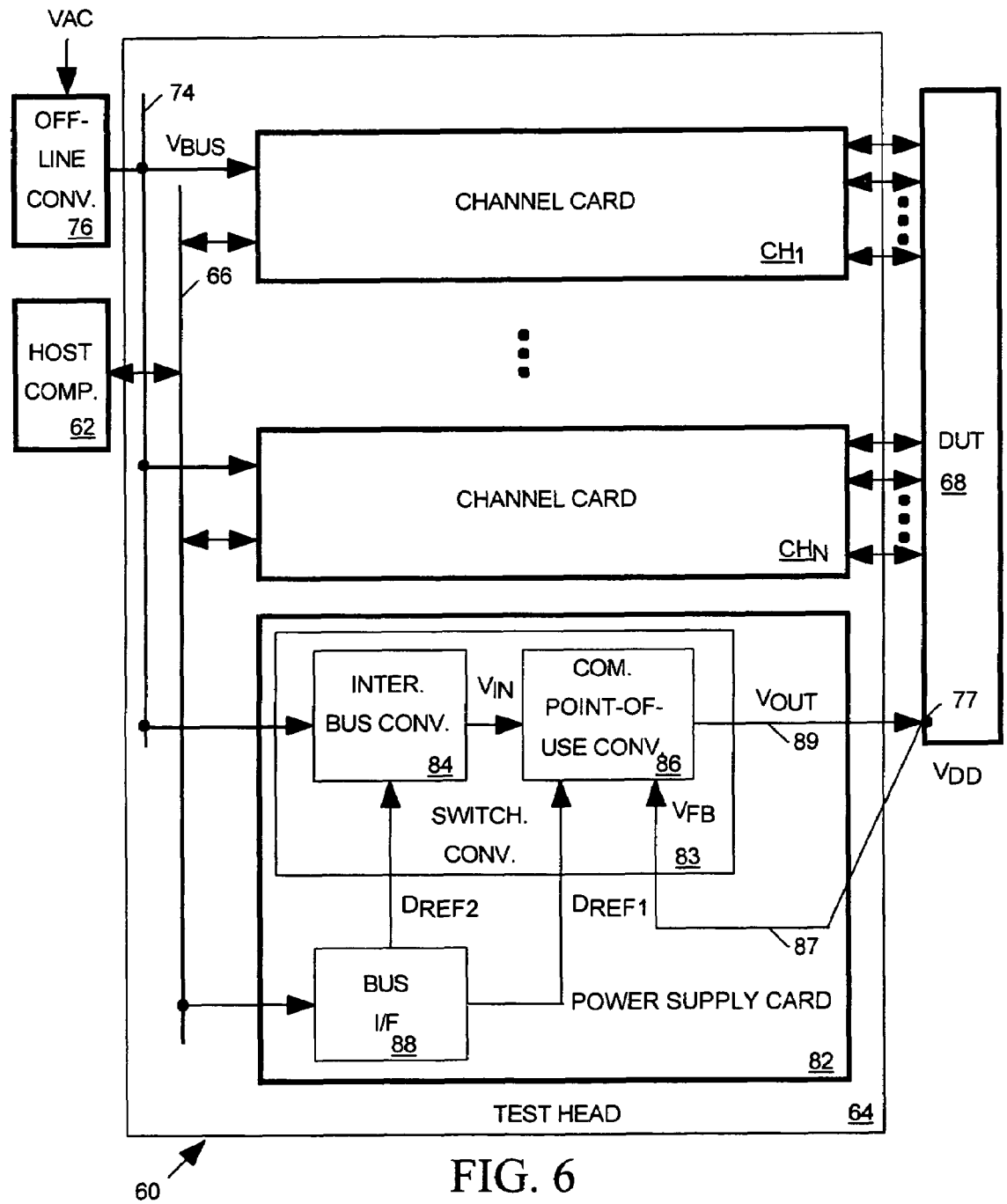
FIG. 6 depicts in block diagram form an integrated circuit tester employing a switching converter in accordance with an exemplary embodiment of the invention.

The invention relates to a power conversion circuit useful, for example, in an IC tester 60 as depicted in FIG. 6. Tester 60 includes a host computer 62 communicating with a test head 64 via a computer bus 66. Before starting a test, host computer 62 sends program instructions to test head 64 via bus 66 defining the test signal patterns to be applied to an IC device under test (DUT) 68 during the test and indicating how the DUT's output signals are expected to behave. Test head 64 includes a number (N>1) of printed circuit channel cards $CH_1$ through $CH_N$, each for transmitting test signals to one or more input terminals of DUT 68, and for monitoring the DUT's output signals and stores test data indicating whether the DUT output signals behave as expected. After the test, each channel card $CH_1$ through $CH_N$ forwards the test data to host computer 62 via bus 66

A power bus 74 distributes a DC power supply signal $V_{BUS}$ produced by an AC-to-DC, "off-line" converter 76 to each channel card $CH_1$-$CH_N$ for powering components on the channel cards. To limit currents on bus 74, the $V_{BUS}$ supply voltage will be relatively high, for example 48 volts DC, but each channel card $CH_1$-$CH_N$ includes circuits for converting the $V_{BUS}$ supply signal into the lower voltage supply signals it uses internally. Test head 64 also includes a power supply card 82 for converting the 48VDC $V_{BUS}$ signal into an output signal of voltage $V_{OUT}$ for driving the DUT's power input terminal 77. Power supply card 82 includes a switching converter 83 in accordance with the invention including an adjustable intermediate bus converter 84 for converting the $V_{BUS}$ signal into a lower voltage DC signal $V_{IN}$, and a compensated point-of-use converter 86 driven by the $V_{IN}$ signal for producing an output signal of adjustable voltage $V_{OUT}$ coupled to the power input terminal 77 of DUT 68 via a transmission line 89.

Test specifications require that during the test, DUT 68 should operate with the voltage $V_{DD}$ at is power terminal held within some specified range of a selected set point voltage $V_{SP}$. A bus interface circuit 88 responds to instructions from host computer 62 via bus 74 by supplying data $D_{REF1}$ for specifying the desired set point voltage $V_{SP}$. During the test, switching converter 83 monitors $V_{DD}$ and adjusts $V_{OUT}$ as necessary to keep $V_{DD}$ as close as possible to $V_{SP}$.

Figure 7:
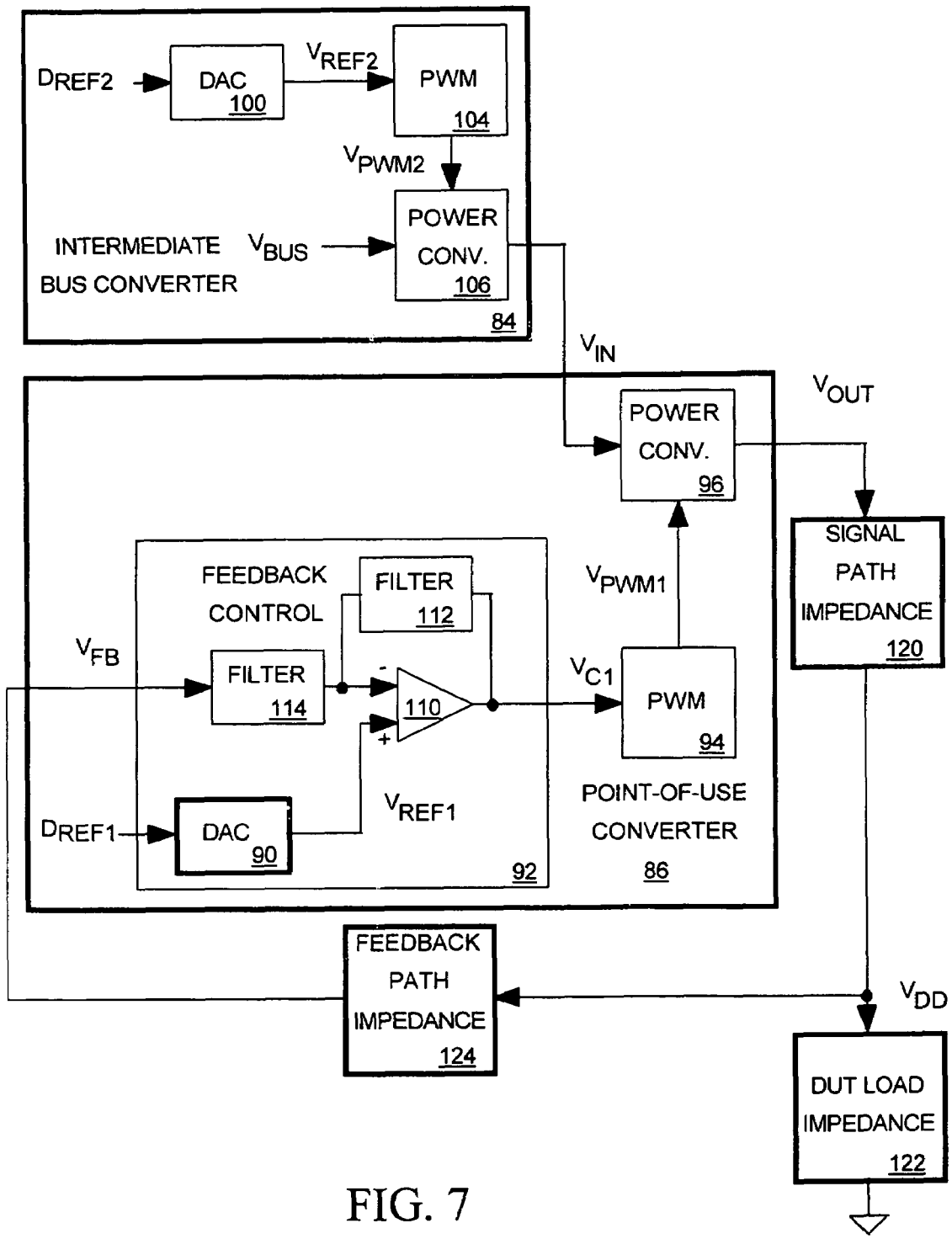
FIG. 7 depicts the switching converter of FIG. 6 in more detailed block diagram form.

FIG. 7 depicts example implementations of converters 84 and 86 of FIG. 6 in more detail, and models various load and transmission line impedances. Converter 86 applies its output signal voltage $V_{OUT}$ across a series combination of the impedance 40 of the signal path connecting converter 86 to DUT 68 and the varying DUT load impedance 42. The signal path impedance 120 attenuates $V_{OUT}$ to produce $V_{DD}$ which can vary as the DUT load impedance 122 varies during a test. To permit converter 86 to monitor $V_{DD}$, a separate feedback path 87 (FIG. 6) feeds $V_{DD}$ back converter 86. Although impedance 124 of feedback path 87 attenuates $V_{DD}$ to produce a feedback voltage $V_{FB}$ supplied as input to converter 86, since the current of the feedback signal is relatively small compared to the current of the $V_{OUT}$ signal, attenuation is relatively small and predictable voltage of feedback signal $V_{FB}$ tracks the voltage of $V_{DD}$ much more closely than the voltage of $V_{DD}$ tracks that of $V_{OUT}$. Thus converter 86 can monitor $V_{DD}$ by monitoring feedback signal $V_{FB}$ and can adjust $V_{OUT}$ as necessary to keep the voltage $V_{DD}$ near its selected set point $V_{SP}$.

The example implementation of intermediate bus converter 86 as shown in FIG. 7 includes a feedback control circuit 92, a pulse-width modulator (PWM) 94, and a power converter 96 for converting the input signal $V_{IN}$ from intermediate bus converter 84 to the $V_{OUT}$ signal supplied to DUT 66 of FIG. 6. A DAC 90 in feedback control circuit 92 converts the $D_{REF1}$ data from host computer 62 (FIG. 6) into a reference signal $V_{REF1}$ indicating the desired set point voltage. Feedback control circuit 92 compares feedback signal $V_{FB}$ to $V_{REF1}$ and produces a control signal $V_{C1}$ telling PWM 94 to produce a pulse-width-modulated output signal $V_{PWM1}$ having a duty cycle $D_1$ controlled by $V_{C1}$. Power converter 96 responds to $V_{PWM1}$ by producing the $V_{OUT}$ signal in response to the $V_{IN}$ signal wherein the duty cycle D1 of $V_{PWM1}$ controls the ratio $V_{OUT}/V_{IN}$.

Intermediate bus converter 84 includes a DAC 100 for converting the $D_{REF2}$ data from the host computer into a control signal $V_{PWM2}$, a PWM circuit 104 for producing a control signal $V_{PWM2}$ having a duty cycle $D_2$ controlled by $V_{PWM2}$, and a power converter 106 that produces $V_{IN}$ in response to $V_{BUS}$, where $V_{IN}/V_{BUS}$ is a function of the duty cycle $D_2$ of $V_{PWM2}$.

Feedback control circuit 92 includes an amplifier 110 and a pair of filters 112 and 114. The $V_{REF1}$ signal output of DAC 90 drives a non-inverting input of amplifier 110. Filter 112 couples the $V_{C1}$ signal output to an inverting input of amplifier 110 while filter 114 couples $V_{FB}$ to the inverting input to amplifier 92. Filters 112 and 114 are suitably designed relative to path impedances 120 and 124 in a manner well-known to those of skill in the art to optimize a desired combination of converter performance criteria such as for example, audio-susceptibility, transient response, closed loop frequency response, noise immunity, and power dissipation. All such performance criteria depend to some extent on the duty cycle $D_1$ of $V_{PWM1}$. Thus filters 112 and 114 are suitably designed to optimize the desired combination of performance criteria when $D_1$ is some particular value $D_X$, such as for example 0.5. During system operation PWM circuit 94 will vary the value of D when the DUT load varies in order to keep $V_{DD}$ near the selected set point voltage $V_{SP}$, but D will normally not vary over a wide range unless the load varies wildly. Since converter 86 is optimized for some particular value $D_X$ of $D_1$, then to ensure that for any selected set point voltage $V_{SP}$, the range of values of $D_1$ should center about $D_X$ during the test so that converter 86 will exhibit substantially optimum performance. The range of values of $D_1$ will center about DX for any selected set point voltage $V_{SP}$ when the magnitude of $V_{SP}/V_{IN}=f(D_X)$, given that for power converter 96, $V_{OUT}/V_{IN}=f(D_1)$. Control data $D_{REF1}$ selects the set point voltage $V_{SP}$ and control data $D_{REF2}$ selects the value of $V_{IN}$. In accordance with the invention, the values of $D_{REF1}$ and $D_{REF2}$ are chosen such $V_{SP}/V_{IN}=D_X$ for each possible value of $V_{SP}$ Suppose, for example, $V_{OUT}$ is to have a range of 1 to 3 volts and that filters 114 and 114 are designed to optimize converter performance characteristics for a value of $f(D_1)=D_X=0.5$. We then provide an intermediate bus converter having an output voltage $V_{IN}$ range of from 2 to 6 volts. When the desired set point voltage $V_{SP}=3$ volts, host computer 62 sets $V_{REF2}$ so the $V_{IN}=6$ volts and sets $V_{REF1}$ so that $V_{OUT}$ is 3 volts when $D_1=0.5$, thereby optimizing the desired combination of performance criteria. When the desired set point voltage VSP=2 volts, host computer 62 sets $V_{REF1}$ so the $V_{IN}=4$ volts and sets $V_{REF1}$ so that the $V_{OUT}$ is 2 volts when $D_1=0.5$, thereby optimizing the desired combination of performance criteria. When the desired set point voltage VSP=1 volt, host computer 62 sets $V_{REF2}$ so $V_{IN}=2$ volts and sets $V_{REF1}$ so that $V_{OUT}$ is 1 volts when D)=0.5, thereby again optimizing the desired combination of performance criteria.

Figure 1:
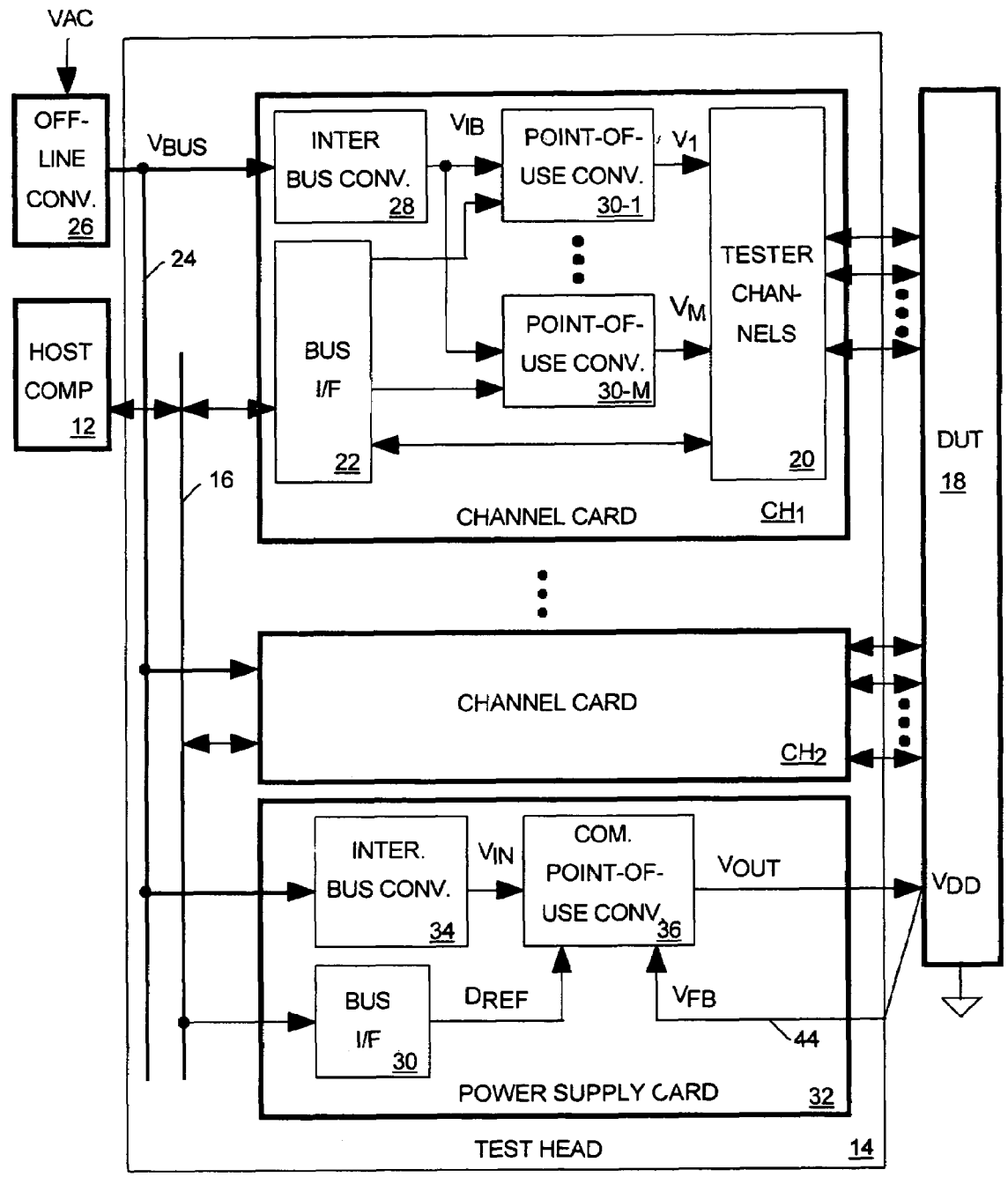
FIG. 1 depicts a prior art integrated circuit tester in block diagram form.
Figure 2:
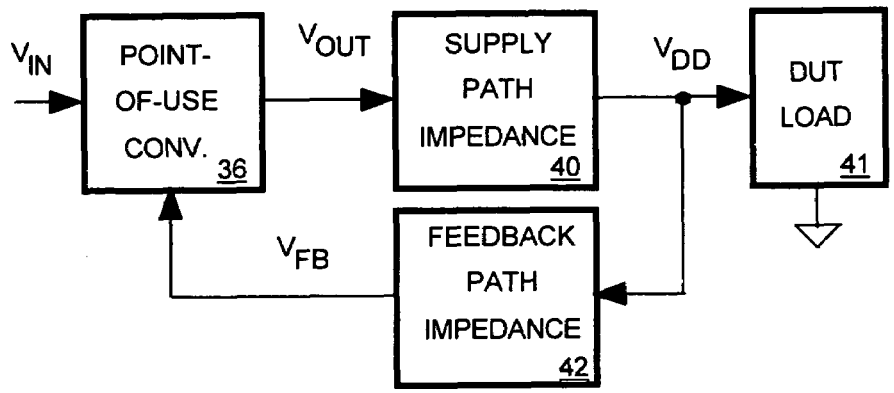
FIG. 2 depicts the point of use converter of FIG. 1, along with its load impedances in block diagram form.
Figure 3:
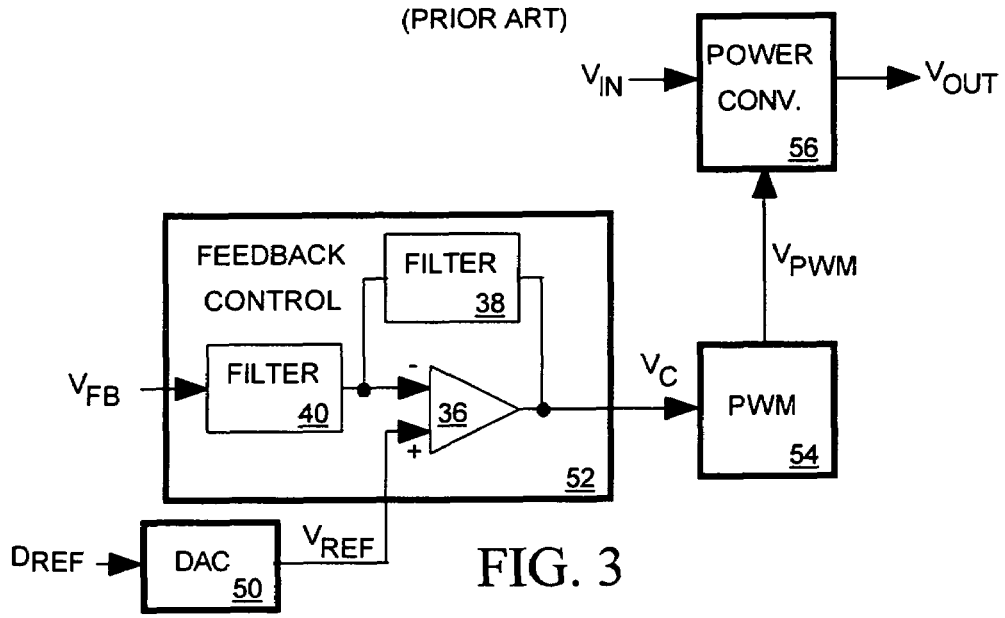
FIG. 3 depicts the prior art point of use converter of FIG. 1 in more detailed block diagram form.
Figure 4:
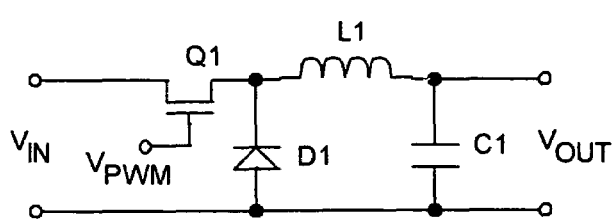
FIG. 4 depicts the prior power converter of FIG. 2 in schematic diagram form.
Figure 5:
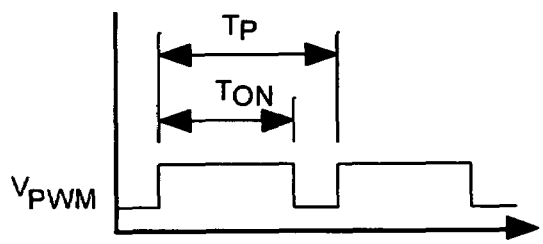
FIG. 5 is a timing diagram depicting behavior of a pulse-width modulated signal of FIG. 3.

Depending on application, the power converter 96 may be implemented by any of a wide variety of well known pulse-width modulated power converters such as, for example, the buck converter of FIG. 4. For all power converters relying on pulse-width modulation, we can generally express $V_{OUT}/V_{IN}$ as some function of duty cycle D:

$$V_{OUT}/V_{IN} = f(D)$$

For the buck converter of FIG. 4, $$f(D) = D$$

For a typical "boost" converter producing an output voltage $V_{OUT}$ that is higher than its input voltage $V_{IN}$, $$f(D) = 1(1-D)$$

For a typical "buck boost" converter producing an output voltage that can be either higher or lower than $V_{IN}$ $$f(D) = -D/(1-D)$$

Other converters known to those of skill in the art, which may be used to implement converter 96, include for example sepic, flyback, forward, two-switch forward, active clamp forward, half bridge, push pull, full bridge, and phase shift converters, each of which has an output-to-input voltage ratio characterized by a function of the duty cycle D of its input pulse-width modulated signal.

Intermediate bus converter 84 of FIG. 7 is illustrated herein as employing a pulse-width modulated converter 106, but in the context of the invention, bus converter 84 functions as an adjustable power source and may therefore be implemented by any kind of power source that can produce a suitably adjustable DC output voltage $V_{IN}$.

Those of skill in the art will understand that while FIG. 7 depicts one particular architecture for feedback control circuit 92, the invention can be implemented using other well-known feedback control circuit architectures.

Thus has been shown and described a switching converter powered by a power supply signal having a fixed voltage $V_{BUS}$ for producing an output signal of voltage $V_{OUT}$ supplied through a signal path 89 to a variable load impedance 122 to produce a load voltage $V_{DD}$ across the load impedance that remains as close as possible to a selected set point voltage selected by control data $D_{REF1}$. The switching converter includes a power converter 96 for producing the output signal, wherein a ratio $V_{OUT}/V_{IN}$ is a function of the duty cycle $D_1$ of a pulse-width modulated signal $V_{PWM1}$; a pulse-width modulation circuit 94 for generating the $V_{PWM}$ signal of duty cycle $D_1$ controlled by control signal $V_{C1}$; a feedback control circuit 92 for adjusting $D_1$ to keep the load voltage $V_{DD}$ as close as possible to $V_{SP}$; and power source 84 for supplying the input signal to the first power converter, wherein a ratio $V_{IN}/V_{BUS}$ is selected by second control data. Data $D_{REF2}$ selects a value of $V_{IN}$ for which the ratio $V_{SP}/V_{IN}$ is substantially the same for all possible set point voltages $V_{SP}$ and is of a value for which switching converter performance is substantially optimal with respect to a selected combination of performance criteria.

Although the D-optimized switching converter in accordance with the invention has been illustrated above as used within an integrated circuit tester, those of skill in the art will appreciate that the switching converter can be employed in other applications in which a point-of-use converter is applied to highly dynamic loads and which may be subject to a wide range of set-point (under program control) voltages.

The invention claimed is:

1. A switching converter for producing an output signal of voltage $V_{OUT}$ supplied through a signal path (89) to a variable load impedance (122) to produce a load voltage $V_{DD}$ across the load impedance, wherein the switching converter adjusts the output signal voltage to keep the load voltage near a set point voltage $V_{SP}$ selected by input first control data ($D_{REF1}$), the switching converter comprising:

a first power converter (96) powered by an input signal of voltage $V_{IN}$ for producing the output signal, wherein a ratio $V_{OUT}/V_{IN}$ is a function of a duty cycle ($D_1$) of a pulse-width modulated first signal ($V_{PWM1}$) supplied as input to the first power converter;

a first pulse-width modulation circuit (94) for generating the first signal with its duty cycle ($D_1$) controlled by a first control signal ($V_{C1}$) supplied as input to the pulse-width modulation circuit;

a feedback control circuit (92), receiving the first control data and monitoring the load voltage, for adjusting the duty cycle of the first signal to keep the load voltage near the set point voltage selected by the first control data; and a power source (84), receiving second control data ($D_{REF2}$) for supplying the input signal of voltage $V_{IN}$ to the first power converter, wherein $V_{IN}$ is selected by second control data ($D_{REF2}$).

2. The switching converter in accordance with claim 1 wherein the first control data can select any one of a plurality of set point voltages, and wherein the second control data selects voltage $V_{IN}$ such that the ratio $V_{SP}/V_{IN}$ is of the same value irrespective of which particular one of the set point voltages the first control data selects.

3. The switching converter in accordance with claim 1 wherein the power source comprises:

a second power converter (106) powered by a power signal of constant voltage $V_{BUS}$ for producing the input signal of voltage $V_{IN}$, wherein a ratio $V_{IN}/V_{BUS}$ is a function of a duty cycle ($D_2$) of a pulse-width modulated second signal ($V_{PWM2}$) supplied as input to the second power converter;

a second pulse-width modulation circuit 94 for generating the second signal with its duty cycle controlled by a second control signal ($V_{REF2}$) supplied as input to the second pulse-width modulation circuit, and a circuit (100) for producing the second control signal in response to the second control data ($D_{REF2}$).

4. The switching converter in accordance with claim 1 wherein the first control data can select any one of a plurality of set point voltages; and wherein when the first control data selects any one of the plurality of set point voltages, the second control data selects a particular value of $V_{IN}$ for which the duty cycle ($D_1$) of the first signal will remain in a range that substantially optimizes a selected performance criteria with respect to load voltage response to variations in load impedance.

5. The switching converter in accordance with claim 4 wherein said range is substantially centered about that particular value ($D_X$) for which the selected performance criteria is optimized.

6. A method for producing a load voltage ($V_{DD}$) across a load impedance (122) that remains near a selected set point voltage $V_{SP}$ as the load impedance varies, the method comprising the steps of:

a. producing an output signal of voltage $V_{OUT1}$ in response to an input signal of $V_{IN}$, wherein a ratio $V_{OUT}/V_{IN}$ is a function of a duty cycle ($D_1$) of a pulse-width modulated first signal ($V_{PWM1}$);

b. generating the first signal with its duty cycle ($D_1$) controlled by a first control signal ($V_{C1}$);

c. adjusting the duty cycle of the first signal to keep the load voltage near the set point voltage selected by the first control data; and d. generating the input signal in response to a power signal of fixed voltage $V_{BUS}$ wherein a ratio $V_{IN}/V_{BUS}$ is selected by second control data.

7. The method in accordance with claim 6 wherein the first control data can select any one of a plurality of set point voltages, and wherein the second control data selects the ratio $V_{IN}/V_{BUS}$ such that the ratio $V_{SP}/V_{IN}$ is of the same value irrespective of which particular one of the set point voltages the first control data selects.

8. The method in accordance with claim 6 wherein step d comprises the substeps of:

d1. producing the input signal of voltage $V_{IN}$ as a function of a duty cycle ($D_2$) of a pulse-width modulated second signal ($V_{PWM2}$) supplied as input to the second power converter, d2. generating the second signal with its duty cycle controlled by a second control signal ($V_{REF2}$); and d3. producing the second control signal of magnitude controlled by second control data ($D_{REF2}$).

9. The switching converter in accordance with claim 1 wherein the first control data can select any one of a plurality of set point voltages, and wherein when the first control data selects any one of the plurality of set point voltages, the second control data selects a particular magnitude of voltage $V_{IN}$ for which the duty cycle ($D_1$) of the first signal will remain in a range that substantially optimizes particular switching converter performance criteria.

10. The switching converter in accordance with claim 9 wherein said range is substantially centered about a particular value ($D_X$) for which the switching converter performance criteria is optimal.

* * * * *